(12) United States Patent
Gou et al.

(10) Patent No.: US 11,361,189 B2
(45) Date of Patent: Jun. 14, 2022

(54) IMAGE GENERATION METHOD AND COMPUTING DEVICE

(71) Applicant: Ping An Technology (Shenzhen) Co., Ltd., Shenzhen (CN)

(72) Inventors: Yuchuan Gou, Sunnyvale, CA (US); Jinghong Miao, San Jose, CA (US); Ruei-Sung Lin, Redwood City, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 358 days.

(21) Appl. No.: 16/701,474

(22) Filed: Dec. 3, 2019

(65) Prior Publication Data
US 2021/0166073 A1 Jun. 3, 2021

(51) Int. Cl.
*G06K 9/62* (2022.01)
*G06N 3/08* (2006.01)
*G06N 3/04* (2006.01)
*G06T 3/40* (2006.01)

(52) U.S. Cl.
CPC ......... *G06K 9/6257* (2013.01); *G06K 9/6262* (2013.01); *G06N 3/0454* (2013.01); *G06N 3/08* (2013.01); *G06T 3/4046* (2013.01); *G06V 2201/07* (2022.01)

(58) Field of Classification Search
CPC .. G06K 9/6257; G06K 9/6262; G06K 9/6271;
G06K 9/6256; G06N 3/0454; G06N 3/08;
G06N 3/0472; G06N 3/088; G06N 7/005;
G06T 3/4046; G06T 11/00; G06V 2201/00
See application file for complete search history.

(56) References Cited

U.S. PATENT DOCUMENTS

| | | | |
|---|---|---|---|
| 10,769,503 B1* | 9/2020 | Buhler | G06K 9/6215 |
| 2019/0035140 A1* | 1/2019 | Fricke | G06T 15/506 |
| 2019/0108413 A1* | 4/2019 | Chen | C12N 15/8281 |
| 2019/0130216 A1* | 5/2019 | Tomioka | G06V 10/242 |
| 2019/0171665 A1* | 6/2019 | Navlakha | G06F 16/532 |
| 2020/0050879 A1* | 2/2020 | Zaman | G06K 9/6267 |
| 2020/0193299 A1* | 6/2020 | Geva | G06V 10/82 |
| 2020/0257890 A1* | 8/2020 | Pu | G06K 9/6201 |
| 2020/0400769 A1* | 12/2020 | Arroyo Camejo | G01R 33/5608 |
| 2021/0049234 A1* | 2/2021 | Kumar | G06F 40/284 |

FOREIGN PATENT DOCUMENTS

CN 108711138 * 6/2018

* cited by examiner

*Primary Examiner* — Qun Shen
(74) *Attorney, Agent, or Firm* — ScienBiziP, P.C.

(57) ABSTRACT

An image generation method and a computing device employing the method includes: acquiring a plurality of original images; and processing the plurality of original images to obtain a training data set. An anti-neural network model is trained according to the training data set. A candidate image is generated through the trained anti-neural network model. The candidate image is complemented through a detail completion network model to obtain a target image according to a comparison image. Thereby, a style of the generated image is the same as that of the comparison image. A more realistic image can be randomly generated saving the time and energy of artificially creating an image.

14 Claims, 2 Drawing Sheets

IMAGE GENERATION METHOD AND COMPUTING DEVICE

FIELD

The present disclosure relates to a technical field of artificial intelligence, specifically an image generation method and a computing device.

BACKGROUND

Artificial Intelligence (AI) is developing, there is already an AI-based composition system, an AI-based writing poetry system, but no AI-based image generation system.

A has an ability to learn for itself and has powerful computing capabilities that can be extended. For example, AI can generate painting images, which can be an arduous and tedious task, even for professional artists.

A scheme for better AI image generation is needed.

DETAILED DESCRIPTION

The embodiments of the present disclosure are described with reference to the accompanying drawings. Described embodiments are merely embodiments which are a part of the present disclosure, and are not every embodiment. All other embodiments obtained by those of ordinary skill in the art based on the embodiments of the present disclosure without creative efforts are within the scope of the claims.

Terms such as "first", "second" and the like in the specification and in the claims of the present disclosure and the above drawings are used to distinguish between different objects, and are not intended to describe a specific order. Moreover, terms "include" and any variations of the term "include" are intended to indicate a non-exclusive inclusion. For example, a process, a method, a system, a product, or a device which includes a series of steps or units is not limited to steps or units which are listed, but can include steps or units which are not listed, or can include other steps or units inherent to such processes, methods, products, and equipment.

Figure 1:
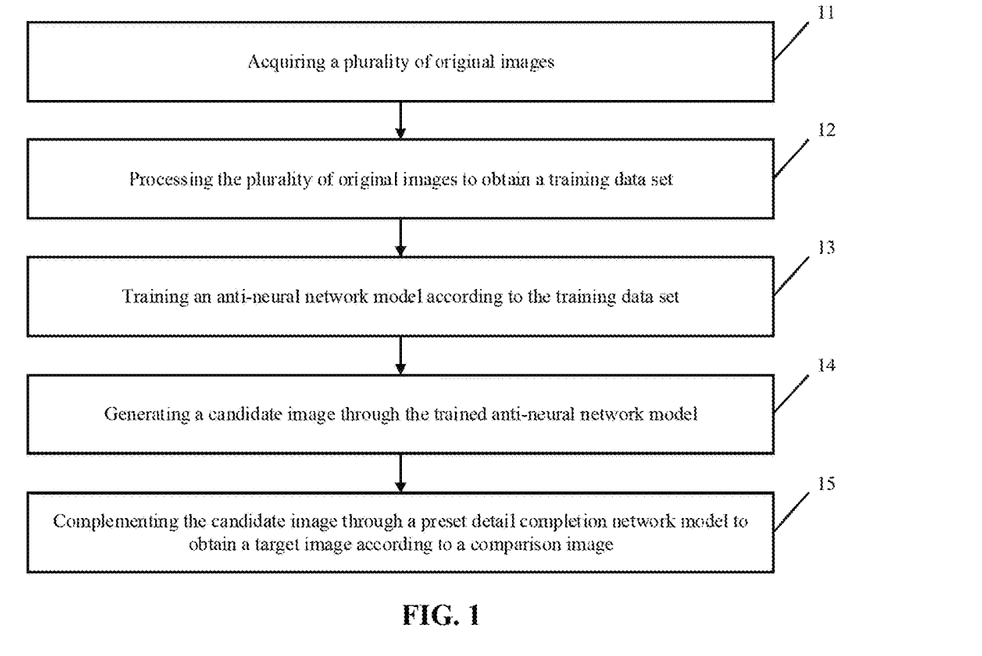
FIG. 1 shows a schematic flow chart of an embodiment of an image generation method according to the present disclosure.

FIG. 1 shows a schematic flow chart of an embodiment of an image generation method according to the present disclosure.

As shown in FIG. 1, the image generation method applicable in a computing device can include the following steps. According to different requirements, the order of the steps in the flow may be changed, and some may be omitted. Within each step, sub-steps may be sub-numbered.

In block 11, acquiring a plurality of original images.

In one embodiment, a large number of different styles of images can be acquired in advance, for example, Chinese landscape original images, oil original images of vases or other objects, landscape oil original images, seascape oil original images, etc., to form an original data set.

The web crawler technology can be used to trawl for the original images from webs. Styles of the images are different. The web crawler technology is prior art, and focus of the present disclosure is not on the web crawler technology, the present disclosure does not introduce web-crawling.

In addition, it should be noted that after acquiring the plurality of original images, it is necessary to classify the original images of a same style. One type of original images is used each time as an original data set to train one anti-neural network model. Different types of original images are used for training different anti-neural network models. For example, a plurality of Chinese landscape original images can be used as a first original data set to train a first anti-neural network model to generate images with Chinese landscape style. A plurality of vase oil original images can be used as a second original data set to train a second anti-neural network model to generate images with vase oil painting style.

In block 12, processing the plurality of original images to obtain a training data set.

The original images acquired in the plurality may have differences in format, size or image quality. Therefore, after acquiring the plurality of original images, it is necessary to preprocess each original image of the plurality of original images to satisfy requirements, thereby improving a training speed and an efficiency of the anti-neural network model.

In some embodiments, the processing of the plurality of original images can include:

121) normalizing a format of each original image to a PNG format.

In order to make the trained anti-neural network model output a better quality image, numerous original images need to be acquired. Formats of these original images acquired from different sources may not be uniform. For example, some original images may be in TIF format, some original images may be in JPG format or JPEG format, and some original images may be in PNG format. Therefore, it is necessary to normalize the format of each original image. Normalizing the format of the plurality of original images can be done quickly and batch-importing the training data set can be done when training the anti-neural network model.

In some embodiment, the original images in non-PNG format can be normalized in the PNG format. Since the PNG format does not compress the original images, resolutions of the original images normalized to the PNG format are higher than those of the JPG format or other format.

Encoding or conversion can be used to normalize the format of the original images, or tools provided by open source software can be uses to normalize the format of the original images.

122) detecting a target object in each of the normalized images and segmenting the target object to obtain a plurality of target images.

In general, a proportionate size of a target object in an original image may be small. For example, a target object in the vase oil painting image is a vase, the vase is only located in a middle of the vase oil painting image, and the other areas in the vase oil painting image are effectively blank.

Since the target object in each of the normalized images does not contain information of any non-target object, speed and efficiency of extracting features of the target objects is realized.

The target object in each of the normalized images can be manually annotated with image annotation tools provided by an open source software. Specifically, boundaries of each target object can be annotated, and then the boundaries of the target object allow segmentation from the normalized image accordingly.

123) normalizing a size of each target image to a preset target size.

In some embodiments, the preset target size is 1024*1024. Sizes of some target images of the plurality of target images are larger, and some are smaller, so it is necessary to normalize the sizes of the plurality of target images. Normalizing the sizes of the plurality of target images enables the anti-neural network model to quickly reach convergence.

Large-sized target objects and images have more detailed features than small-sized target images, so large-sized images in training data set for training the anti-neural network model are preferred. Generating larger-sized images will be more expressive in terms of detail.

In some embodiments, before normalizing a size of each target image to a preset target size, the method further includes:

123A) obtaining an initial size of each target image;
123B) determining whether the initial size is greater than a preset size threshold;
123C) calculating a quality of each target image when it is determined that the initial size is greater than or equal to the preset size threshold;
123D) determining whether the quality is greater than a preset quality threshold;
123E) retaining the target image when it is determined that the quality is greater than or equal to the preset quality threshold;
123F) deleting the target image when it is determined that the size is smaller than the preset size threshold, or that the size is greater than or equal to the preset size threshold but the quality is less than the preset quality threshold.

In the above embodiment, the preset size threshold is greater than or equal to the preset target size.

Sampling small-sized target images to that of the preset target size reduces quality. In addition, even if the size of the target image is large, the quality of the large-sized target image may be poor, the detail information may be small, and fewer features can be extracted. By retaining the target images with larger sizes (the sizes of the target images are greater than or equal to the preset size threshold, for example, 1024*1024) and higher qualities (the qualities of the target images are greater than or equal to the preset quality threshold), and deleting the target images with smaller sizes and poor qualities, high qualities and large sizes in the training data set are ensured. The anti-neural network model trained based on such training data set has higher robustness.

In block 13, training an anti-neural network model according to the training data set.

In some embodiments, a preset anti-neural network can be set in advance. The preset anti-neural network is a Progressive Growing of Generative Adversarial Net (PGGAN).

Figure 2:
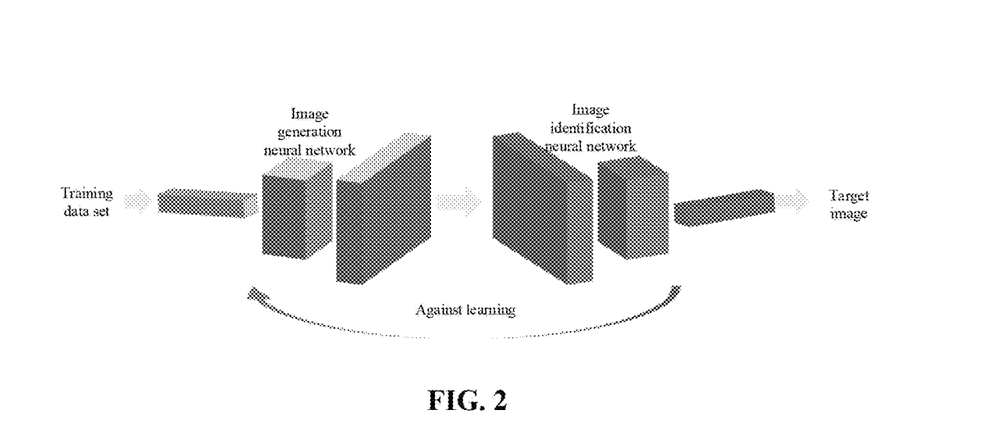
FIG. 2 shows a schematic structural diagram of a network architecture of an anti-neural network.

As shown in FIG. 2, the preset anti-neural network includes an image generation neural network and an image identification neural network. The image generation neural network uses a reverse convolutional neural network, and the image identification neural network uses a convolutional neural network.

In one embodiment, the image generation neural network and the image identification neural network fight against each other, until images generated by the trained anti-neural network model meet needs of a user.

To facilitate understanding of the solution of the present disclosure, the principles of the anti-neural network are briefly introduced.

One anti-neural network includes two networks: a generating network G (Generator) and a discriminating network D (Discriminator). The generating network G: receives a random noise z, and generates an image which is recorded as $G(z)$ according to the noise z. The discriminating network D: determines whether an image is "real". An input parameter is an image x, an output is $D(x)$, and $D(x)$ represents a probability that x is a real image. If $D(x)$ is 1, it means that the image x is deemed to be a real image. If $D(x)$ is 0, it means that the image x is deemed not to be a real image. In a training process, a goal of the generating network G is to generate a real image as much as possible to deceive the discriminating network D, a goal of the discriminating network D is to separate the image generated by the generating network G from the real image as much as possible.

In some embodiments, the training an anti-neural network model according to the training data set includes:

131) putting images belonging to a same type of the training data set into a preset anti-neural network, the preset anti-neural network comprises an image generation neural network and an image identification neural network;
132) ending the training of the anti-neural network, when a quality difference within pairs of images continuously generated by the image generation neural network is less than a preset first threshold and a loss function value of the image identification neural network is less than a preset second threshold.

One style of training data set can be used as input to separately train one anti-neural network model, instead of using different styles of training data set as input to train one anti-neural network model is quicker and more efficient.

In block 14, generating a candidate image through the trained anti-neural network model.

The image generation neural network of the trained anti-neural network model can generate many different images at one time.

In some embodiments, the generating of a candidate image through the trained anti-neural network model includes:

141) generating a random number using a random algorithm;
142) generating a plurality of interesting images through the trained anti-neural network model;
143) obtaining a plurality of hash values by calculating a hash value of each interesting image;
144) selecting a target hash value equal to the random number from the plurality of hash values;
145) determining an image corresponding to the target hash value as the candidate image.

In the above embodiment, a hash function may be used to calculate a hash value of each interesting image, contents of each of the plurality of interesting images are different, and corresponding hash values are different.

In some embodiments, in order to enhance the quality of the images generated by the image generation neural network, and reduce fuzziness and irregular textures, the up-sampling in PGGAN is changed from an inverse convolution to a nearest neighbor plus convolution.

In block 15, complementing the candidate image through a detail completion network model to obtain a target image according to a comparison image.

The candidate image generated by the image generation neural network of the anti-neural network model may lack detail, thereby the candidate image being somewhat distorted and uncoordinated as a whole.

In some embodiments, a user can designate an image as the comparison image in advance. According to a type and a style of the comparison image, details of the generated candidate image are complemented to obtain a desired target image. The target image and the comparison image have the same style.

In some embodiments, the complementing of the candidate image through a detail completion network model to obtain a target image according to a comparison image includes:

151) inputting the candidate image and the comparison image into the detail completion network model;

152) extracting preset features of the comparison image using the detail completion network model;

153) adding the extracted preset features to the candidate image using the detail completion network model to obtain the target image.

If for example a painting of Van Gogh is used as a comparison image, the preset features of the painting, such as contrast, brightness, texture, color information, etc., are extracted by the detail completion network model. Adding the extracted contrast, brightness, texture, color information, etc. to the candidate image renders the style of the target image similar to that of a Van Gogh painting.

In some embodiments, the detail completion network model described in the above embodiments is a Markov random field model.

The Markov random field model is trained by millions of images, so that a high-level performance of an image can be obtained, and the high-level performance corresponds to detailed features of local areas of the image. It is possible to add the detail features in one image into another image through the Markov random field model, not only retaining an overall content of the other image, but also adding the detail features. Compared with the matching by pixel level, the Markov random field model can better extract the detailed features of the local areas in the comparison image, and more naturally add the detail features of the local areas into the candidate image.

In one embodiment, the smaller the difference between the high-level performance of the candidate image and the comparison image, the closer in styles of the candidate image and the comparison image will be. In order to reduce the difference in high-level performance between the candidate image and the comparison image, the candidate image and the comparison image can be split into a plurality of small pieces and the plurality of small pieces can be synthesized by using Markov Random Field.

Synthesizing an image x as follows:

$$x = \mathrm{argmin} Es(\Phi(x), \Phi(Xs)) + \alpha 1 Ec(\Phi(x), \Phi(Xc)) + \alpha 1 \gamma(x) \quad (1)$$

Among them, Es represents a style loss function for the candidate image and the comparison image, $\Phi(x)$ represents the high-level representation of the comparison image X; Ec represents a content loss function for the candidate image, and the comparison image $\gamma$ is a smoothing limit function.

The following describes in detail how each function is calculated:

The style loss function is:

$$Es(\Phi(x), \Phi(Xs)) = \Sigma_{i=1}^{m} \|\varphi_i(\Phi(x)) - \varphi_{NN(i)}(\Phi(Xs))\|^2 \quad (2)$$

Wherein, $\varphi(\Phi(x))$ is a set of local regions of $\Phi(x)$, each small local region is represented by a dimension such that k×k×C. Therein, k is a length and a width of the local regions in a layer network, C is number of channels of the local regions, and m is a base. For each small local region, the normalized cross-correlation is used to find a best matching local region in the comparison image.

$$\varphi_{NN(i)}\left(\Phi(Xs): NN(i) = \mathrm{argmin} \frac{\varphi_i(\Phi(x))\varphi_j(\Phi(Xs))}{|\varphi_i(\Phi(x))||\varphi_j(\Phi(Xs))|}\right) \quad (3)$$

The content loss function is:

$$Ec(\Phi(x), \Phi(Xc)) = \|\Phi(x) - \Phi(Xc)\|^2 \quad (4)$$

The purpose of the content loss function is to minimize the $\Phi(x)$ of the generated candidate painting and the comparison image.

The smoothing limit function is:

$$\gamma(x) = \Sigma_{i,j}((x_{i,j+1} - x_{i,j})^2 + \Sigma_{i,j}((x_{i+1,j} - x_{i,j})^2) \quad (5)$$

When synthesizing paintings through a deep network, noise and non-natural effects will occur, so it is necessary to enhance a smoothness of the painting by using a squared gradient norm.

For parameters $\alpha 1$ and $\alpha 2$, if $\alpha 1=0$, it is a non-guided synthesis. The target image similar to the comparison image is automatically generated by noise. If $\alpha 1 \neq 0$ and $\alpha 1$ larger, the generated target image is closer to the candidate image. On the other hand, if $\alpha 1 \neq 0$ and $\alpha 1$ smaller, the generated target image is closer to the comparison image.

The image generation method provided by the embodiment of the present disclosure applies artificial intelligence to image generation. Based on the plurality of original images, the anti-neural network model is taught and trained, thus a realistic image can be randomly generated. Then the generated image and a user-specified comparison image are simultaneously input into the detail completion network model. The generated image is complemented by the preset detail completion network. Thereby the style of the generated image is the same as that of the comparison image. It can be seen that only a small plurality of images need to be collected, and a more realistic image can be randomly generated, which saves the time and energy of artificially creating images, mass production can be achieved. This has significance in the field of image restoration and the like.

Figure 3:
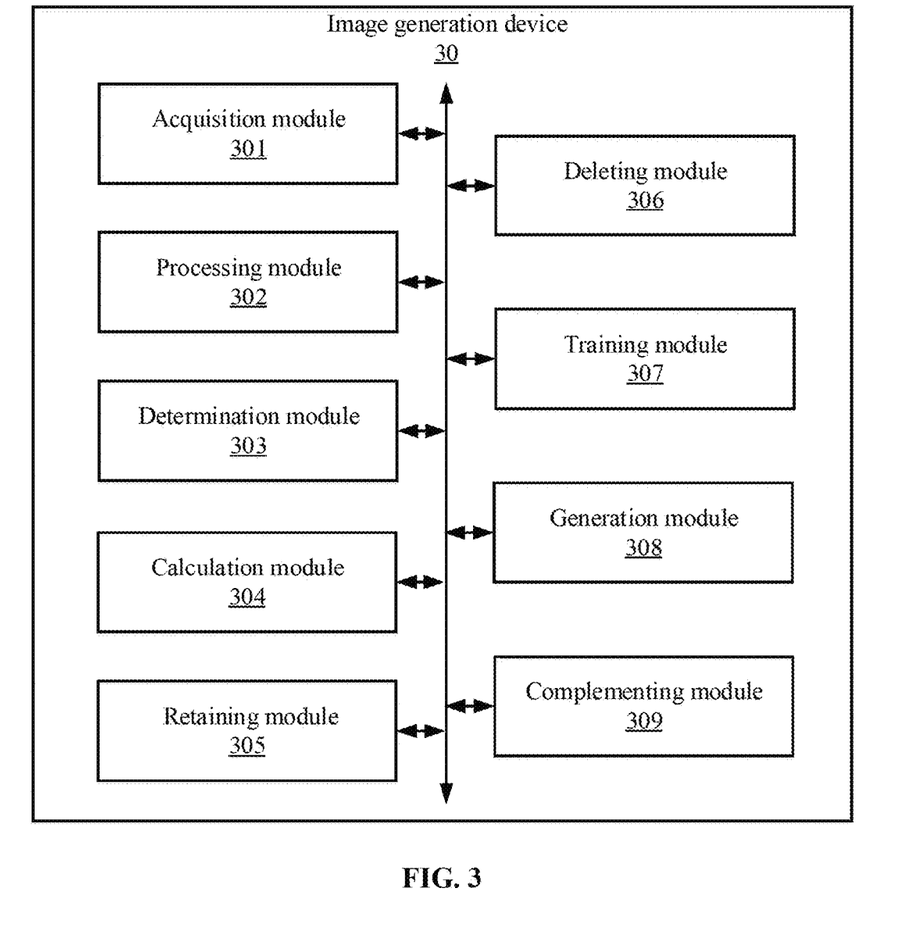
FIG. 3 shows a schematic structural diagram of an embodiment of an image generation device according to the present disclosure.

FIG. 3 shows a schematic structural diagram of an embodiment of an image generation device (image generation device 30) according to the present disclosure.

In some embodiments, the image generation device 30 can include a plurality of function modules consisting of program code segments. The program code of each program code segments in the image generation device based on an image generation device 30 may be stored in a memory of a computing device and executed by the at least one processor to perform (described in detail in FIG. 1) a function of generating images.

In an embodiment, the image generation device 30 can be divided into a plurality of functional modules, according to the performed functions. The functional modules can include: an acquisition module 301, a processing module 302, a determination module 303, a calculation module 304, a retaining module 305, a deleting module 306, a training module 307, a generation module 308, and a complementing module 309. A module as referred to in the present disclosure refers to a series of computer program segments that can be executed by at least one processor and that are capable of performing fixed functions, which are stored in a memory. In this embodiment, the functions of each module will be detailed in the following embodiments.

The acquisition module 301 is configured to acquire a plurality of original images.

In one embodiment, a large number of different styles of images can be acquired in advance, for example, Chinese landscape original images, oil original images of vases or other objects, landscape oil original images, seascape oil original images, etc., to form an original data set.

The web crawler technology can be used to trawl for the original images from webs. Styles of the images are different. The web crawler technology is known in prior art, and focus of the present disclosure is not on the web crawler technology, the present disclosure does not introduce web-crawling.

In addition, it should be noted that after acquiring the plurality of original images, it is necessary to classify the original images of a same style. One type of original images is used each time as an original data set to train one anti-neural network model. Different types of original images are used for training different anti-neural network models. For example, a plurality of Chinese landscape original images can be used as a first original data set to train a first anti-neural network model to generate images with Chinese landscape style. A plurality of vase oil original images can be used as a second original data set to train a second anti-neural network model to generate images with vase oil painting style.

The processing module 302 is configured to process the plurality of original images to obtain a training data set.

The original images acquired in the plurality may have differences in format, size or image quality. Therefore, after acquiring the plurality of original images, it is necessary to preprocess each original image of the plurality of original images to satisfy requirements, thereby improving a training speed and an efficiency of the anti-neural network model.

In some embodiments, the processing module 302 being configured to process the plurality of original images can include:

121) normalizing a format of each original image to a PNG format.

In order to make the trained anti-neural network model output a better quality image, numerous original images need to be acquired. Formats of these original images acquired from different sources may not be uniform. For example, some original images may be in TIF format, some original images may be in JPG format or JPEG format, and some original images may be in PNG format. Therefore, it is necessary to normalize the format of each original image. Normalizing the format of the plurality of original images can be done quickly and batch-importing the training data set can be done when training the anti-neural network model.

In some embodiment, the original images in non-PNG format can be normalized in the PNG format. Since the PNG format does not compress the original images, resolutions of the original images normalized to the PNG format are higher than those of the JPG format or other format.

Encoding or conversion can be used to normalize the format of the original images, or tools provided by open source software can be uses to normalize the format of the original images.

122) detecting a target object in each of the normalized images and segment the target object to obtain a plurality of target images.

In general, a proportionate size of a target object in an original image may be small. For example, a target object in the vase oil painting image is a vase, the vase is only located in a middle of the vase oil painting image, and the other areas in the vase oil painting image are effectively blank.

Since the target object in each of the normalized images does not contain information of any non-target object, speed and efficiency of extracting features of the target objects is realized.

The target object in each of the normalized images can be manually annotated with image annotation tools provided by an open source software. Specifically, boundaries of each target object can be annotated, and then the boundaries of the target object allow segmentation from the normalized image accordingly.

123) normalizing a size of target image to a preset target size.

In some embodiments, the preset target size is 1024*1024. Sizes of some target images of the plurality of target images are larger, and some are smaller, so it is necessary to normalize the sizes of the plurality of target images. Normalizing the sizes of the plurality of target images enables the anti-neural network model to quickly reach convergence.

Large-sized target objects and images have more detailed features than small-sized target images, so large-sized images in training data set for training the anti-neural network model are preferred. Generating larger-sized images will be more expressive in terms of detail.

In some embodiments, the acquisition module 301 is also configured to obtain an initial size of each target image, before normalizing a size of each target image to a preset target size.

The determination module 303 is configured to determine whether the initial size is greater than a preset size threshold.

The calculation module 304 is configured to calculate a quality of each target image when it is determined that the initial size is greater than or equal to the preset size threshold.

The determination module 303 is also configured to determine whether the quality is greater than a preset quality threshold.

The retaining module 305 is configured to the target image when it is determined that the quality is greater than or equal to the preset quality threshold.

The deleting module 306 is configured to delete the target image when it is determined that the size is smaller than the preset size threshold, or that the size is greater than or equal to the preset size threshold but the quality is less than the preset quality threshold.

In the above embodiment, the preset size threshold is greater than or equal to the preset target size.

Sampling small-sized target images to that of the preset target size reduces quality. In addition, even if the size of the target image is large, the quality of the large-sized target image may be poor, the detail information may be small, and fewer features can be extracted. By retaining the target images with larger sizes (the sizes of the target images are greater than or equal to the preset size threshold, for example, 1024*1024) and higher qualities (the qualities of the target images are greater than or equal to the preset quality threshold), and deleting the target images with smaller sizes and poor qualities, high qualities and large sizes in the training data set are ensured. The anti-neural network model trained based on such training data set has higher robustness.

The training module 307 is configured to train an anti-neural network model according to the training data set.

In some embodiments, a preset anti-neural network can be set in advance. The preset anti-neural network is a Progressive Growing of Generative Adversarial Net (PGGAN).

As shown in FIG. 2, the preset anti-neural network includes an image generation neural network and an image identification neural network. The image generation neural network uses a reverse convolutional neural network, and the image identification neural network uses a convolutional neural network.

In one embodiment, the image generation neural network and the image identification neural network fight against each other, until images generated by the trained anti-neural network model meet needs of a user.

To facilitate understanding of the solution of the present disclosure, the principles of the anti-neural network are briefly introduced.

One anti-neural network includes two networks: a generating network G (Generator) and a discriminating network D (Discriminator). The generating network G: receives a random noise z, and generates an image which is recorded as G(z) according to the noise z. The discriminating network D: determines whether an image is "real". An input parameter is an image x, an output is D(x), and D(x) represents a probability that x is a real image. If D(x) is 1, it means that the image x is deemed to be a real image. If D(x) is 0, it means that the image x is deemed not to be a real image. In the training process, a goal of the generating network G is to generate a real image as much as possible to deceive the discriminating network D, a goal of the discriminating network D is to separate the image generated by the generating network G from the real image as much as possible.

In some embodiments, the training module 307 being configured to train an anti-neural network model according to the training data set includes:

131) putting images belonging to a same type of the training data set into a preset anti-neural network, the preset anti-neural network comprises an image generation neural network and an image identification neural network;

132) ending the training of the anti-neural network, when a quality difference within pairs of images continuously generated by the image generation neural network is less than a preset first threshold and a loss function value of the image identification neural network is less than a preset second threshold.

One style of training data set can be used as input to separately train one anti-neural network model, instead of using different styles of training data set as input to train one anti-neural network model is quicker and more efficient.

The generation module 308 is configured to generate a candidate image through the trained anti-neural network model.

The image generation neural network of the trained anti-neural network model can generate many different images at one time.

In some embodiments, the generation module 308 being configured to generate a candidate image through the trained anti-neural network model includes:

141) generating a random number using a random algorithm;

142) generating a plurality of interesting images through the trained anti-neural network model;

143) obtaining a plurality of hash values by calculating a hash value of each interesting image;

144) selecting a target hash value equal to the random number from the plurality of hash values;

145) determining an image corresponding to the target hash value as the candidate image.

In the above embodiment, a hash function may be used to calculate a hash value of each interesting image, contents of each of the plurality of interesting images are different, and corresponding hash values are different.

In some embodiments, in order to enhance the quality of the paintings generated by the image generation neural network, and reduce fuzziness and irregular textures, the up-sampling in PGGAN is changed from an inverse convolution to a nearest neighbor plus convolution.

The complementing module 309 is configured to complement the candidate image through a detail completion network model to obtain a target image according to a comparison image.

The candidate image generated by the image generation neural network of the anti-neural network model may lack detail, thereby the candidate image being somewhat distorted and uncoordinated as a whole.

In some embodiments, a user can designate an image as the comparison image in advance. According to a type and a style of the comparison image, details of the generated candidate image are complemented to obtain a desired target image. The target image and the comparison image have the same style.

In some embodiments, the complementing module 309 being configured to complement the candidate image through a detail completion network model to obtain a target image according to a comparison image includes:

151) inputting the candidate image and the comparison image into the detail completion network model;

152) extracting preset features of the comparison image using the detail completion network model;

153) adding the extracted preset features to the candidate image using the detail completion network model to obtain the target image.

If for example a painting of Van Gogh is used as a comparison image, the preset features of the painting such as contrast, brightness, texture, color information, etc., are extracted by the detail completion network model. Adding the extracted contrast, brightness, texture, color information, etc. to the candidate image renders the style of the target image similar to that of a Van Gogh painting.

In some embodiments, the detail completion network model described in the above embodiments is a Markov random field model.

The Markov random field model is trained by millions of images, so that a high-level performance of an image can be obtained, and the high-level performance corresponds to detailed features of local areas of the image. It is possible to add the detail features in one image into another image through the Markov random field model, not only retaining an overall content of the other image, but also adding the detail features. Compared with the matching by pixel level, the Markov random field model can better extract the detailed features of the local areas in the comparison image, and more naturally add the detail features of the local areas into the candidate image.

In one embodiment, the smaller the difference between the high-level performance of the candidate image and the comparison image, the closer in styles of the candidate image and the comparison image will be. In order to reduce the difference in high-level performance between the candidate image and the comparison image, the candidate image and the comparison image can be split into a plurality of small pieces and the plurality of small pieces can be synthesized by using Markov Random Field.

Synthesizing an image x as follows:

$$x = \arg\min Es(\Phi(x), \Phi(Xs)) + \alpha 1 Ec(\varphi(x), \varphi(Xc)) + \alpha 1 \gamma(x) \quad (1)$$

Among them, Es represents a style loss function for the candidate image and the comparison image, Φ(x) represents the high-level representation of the comparison image X; Ec represents a content loss function for the candidate image, and the comparison image γ is a smoothing limit function.

The following describes in detail how each function is calculated:

The style loss function is:

$$Es(\Phi(x), \Phi(Xs)) = \Sigma_{i=1}^{m} \|\varphi_i(\Phi(x)) - \varphi_{NN(i)}(\Phi(Xs))\|^2 \quad (2)$$

Wherein, ϕ(Φ(x)) is a set of local regions of Φ(x), each small local region is represented by a dimension such that k×k×C. Therein, k is a length and a width of the local regions in a layer network, C is number of channels of the local regions, and m is a base. For each small local region, the normalized cross-correlation is used to find a best matching local region in the comparison image.

$$\varphi_{NN(i)}\left(\Phi(Xs): NN(i) = \arg\min \frac{\varphi_i(\Phi(x)\varphi_j(\Phi(Xs))}{|\varphi_i(\Phi(x)\varphi||_j(\Phi(Xs)|}\right) \quad (3)$$

The content loss function is:

$$Ec(\Phi(x), \Phi(Xc)) = \|\Phi(x) - \Phi(Xc)\|^2 \quad (4)$$

The purpose of the content loss function is to minimize the Φ(x) of the generated candidate painting and the comparison image.

The smoothing limit function is:

$$\gamma(x) = \Sigma_{i,j}((x_{i,j+1} - x_{i,j})^2 + \Sigma_{i,j}((x_{i+1,j} - x_{i,j})^2) \quad (5)$$

When synthesizing paintings through a deep network, noise and non-natural effects will occur, so it is necessary to enhance a smoothness of the painting by using a squared gradient norm.

For parameters α1 and α2, if α1=0, it is a non-guided synthesis. The target image similar to the comparison image is automatically generated by noise. If α1≠0 and α1 larger, the generated target image is closer to the candidate image. On the other hand, if α1≠0 and α1 smaller, the generated target image is closer to the comparison image.

The image generation device provided by the embodiment of the present disclosure applies artificial intelligence to image generation. Based on the plurality of original images, the anti-neural network model is taught and trained, thus a realistic image can be randomly generated. Then the generated image and a user-specified comparison image are simultaneously input into the detail completion network model. The generated image is complemented by the preset detail completion network. Thereby the style of the generated image is the same as that of the comparison image. It can be seen that only a small plurality of images need to be collected, and a more realistic image can be randomly generated, which saves the time and energy of artificially creating images, mass production can be achieved. This has significance in the fields of image restoration and the like.

Figure 4:
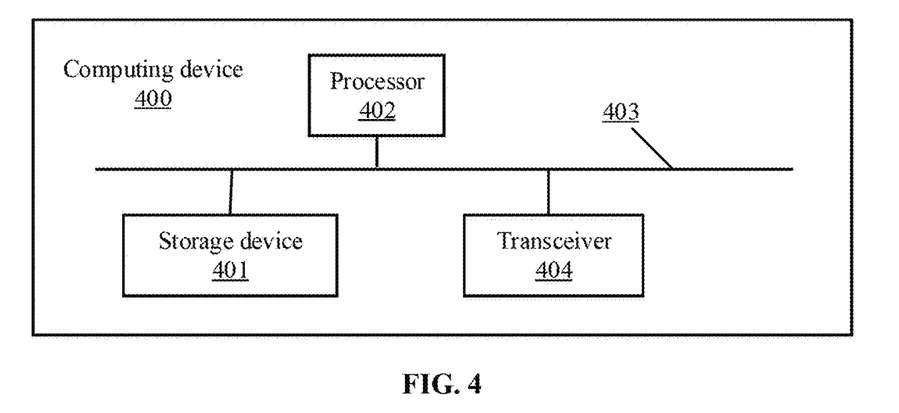
FIG. 4 shows a schematic structural diagram of a computing device according to the present disclosure.

FIG. 4 shows a schematic structural diagram of a computing device (computing device 400) according to an embodiment of the present disclosure.

As shown in FIG. 4, the computing device 400 may include: at least one storage device 401, at least one processor 402, at least one communication bus 403, and a transceiver 404.

It should be understood by those skilled in the art that the structure of the computing device 400 shown in FIG. 4 does not constitute a limitation of the embodiment of the present disclosure. The computing device 400 may be a bus type structure or a star type structure, and computing device 400 may also include more or less hardware or software than illustrated, or may have different component arrangements.

In at least one embodiment, the computing device 400 can include a terminal that is capable of automatically performing numerical calculations and/or information processing in accordance with pre-set or stored instructions. The hardware of the terminal can include, but is not limited to, a microprocessor, an application specific integrated circuit, programmable gate arrays, digital processors, and embedded devices. The computing device 400 may further include an electronic device. The electronic device can interact with a user through a keyboard, a mouse, a remote controller, a touch panel or a voice control device, it can be for example an individual computer, a tablet, a smartphone, or a digital camera, etc.

It should be noted that the computing device 400 is merely an example, and other existing or future electronic products may be included in the scope of the present disclosure, and are included in the reference.

In some embodiments, the storage device 401 can be used to store program codes of computer readable programs and various data, such as the image generation device 30 installed in the computing device 400, and allow automatic access to the programs. The storage device 401 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other non-transitory storage medium readable by the computing device 400 that can be used to carry or store data.

In some embodiments, the at least one processor 402 may be composed of an integrated circuit, for example, may be composed of a single packaged integrated circuit, or may be composed of multiple integrated circuits of same function or different functions. The at least one processor 402 can include one or more central processing units (CPU), a microprocessor, a digital processing chip, a graphics processor, and various control chips. The at least one processor 402 is a control unit of the computing device 400, which connects various components computing device using various interfaces and lines. By running or executing a computer program or modules stored in the storage device 401, and by invoking the data stored in the storage device 401, the at least one processor 402 can perform various functions.

In some embodiments, the least one bus 403 is used to achieve communication between the storage device 401 and the at least one processor 402, and other components of the computing device 400.

Although it is not shown, the computing device 400 may further include a power supply (such as a battery) for powering various components. Preferably, the power supply may be logically connected to the at least one processor 402 through a power management device, thereby, the power management device manages functions such as charging, discharging, and power management. The power supply may include DC or AC power source or both, a recharging device, a power failure detection circuit, a power converter or inverter, a power status indicator, and the like. The computing device 400 may further include various sensors, such as a BLUETOOTH module, a WI-FI module, and the like, and details are not described herein.

It should be understood that the described embodiments are for illustrative purposes only and are not limited by the scope of the present disclosure.

The above-described integrated unit implemented in form of software function modules can be stored in a computer readable storage medium. The above software function modules are stored in a storage medium, and include a plurality of instructions for causing a computing device (which may be a personal computer, or a network device, etc.) or a processor to execute the method according to various embodiments of the present disclosure.

In a further embodiment, in conjunction with FIG. 1, the at least one processor 402 can execute an operating system and various types of applications (such as the image generation device 30) installed in the computing device 400, program codes, and the like. For example, the at least one processor 402 can execute the modules 301-309.

In at least one embodiment, the storage device 401 stores program codes. The at least one processor 402 can invoke the program codes stored in the storage device 401 to perform related functions. For example, the modules described in FIG. 3 are program codes stored in the storage device 401 and executed by the at least one processor 402, to implement the functions of the various modules.

In at least one embodiment, the storage device 401 stores a plurality of instructions that are executed by the at least one processor 402 to implement all or part of the steps of the method described in the embodiments of the present disclosure.

Specifically, the storage device 401 stores the plurality of instructions which, when executed by the at least one processor 402, causes the at least one processor 402 to:

acquire a plurality of original images;

process the plurality of original images to obtain a training data set;

train an anti-neural network model according to the training data set;

generate a candidate image through the trained anti-neural network model; and complement the candidate image through a detail completion network model to obtain a target image according to a comparison image.

The embodiments of the present disclosure further provide a computer storage medium, and the computer storage medium stores a program that performs all or part of the steps including any of the method described in the above embodiments.

A non-transitory storage medium having stored thereon instructions that, when executed by a processor of a computing device, causes the computing device to perform an image generation method, the method comprising: acquiring a plurality of original images; processing the plurality of original images to obtain a training data set; training an anti-neural network model according to the training data set; generating a candidate image through the trained anti-neural network model; and complementing the candidate image through a detail completion network model to obtain a target image according to a comparison image.

It should be noted that, for simplicity in description, the above method embodiments are expressed as a series of action combinations, but those skilled in the art should understand that the present disclosure is not limited by the described action sequence. According to the present disclosure, some steps in the above embodiments can be performed in other sequences or simultaneously. Secondly, those skilled in the art should also understand that the embodiments described in the specification are all optional embodiments, and the actions and units involved are not necessarily required by the present disclosure.

In the above embodiments, descriptions of each embodiment have different focuses, and when there is no detail part in a certain embodiment, other embodiments will make it clear.

In several embodiments provided in the preset application, it should be understood that the disclosed apparatus can be implemented in other ways. For example, the device embodiments described above are merely illustrative. For example, divisions of the units are only a logical function division, and there can be other ways of division in actual implementation.

The modules described as separate components may or may not be physically separated, and the components displayed as modules may or may not be physical units. That is, it can be located in one place, or distributed to multiple network units. Some or all of the modules can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

The above embodiments are only used to illustrate technical solutions of the present disclosure, rather than restrictions on the technical solutions. Although the present disclosure has been described in detail with reference to the above embodiments, those skilled in the art should understand that the technical solutions described in one embodiments can be modified, or some of technical features can be equivalently substituted, and these modifications or substitutions are not to detract from the essence of the corresponding technical solutions or from the scope of the technical solutions of the embodiments of the present disclosure.

We claim:

1. An image generation method applicable in a computing device, the method comprising:

acquiring a plurality of original images;

processing the plurality of original images to obtain a training data set, comprising:

normalizing a format of each of the plurality of original images to a Portable Network Graphics (PNG) format;

detecting a target object in each of the normalized images and obtaining a plurality of target images by segmenting the target object;

obtaining an initial size of each of the plurality of target images;

determining whether the initial size is greater than a preset size threshold;

calculating a quality of each of the plurality of target images in response that the initial size is greater than or equal to the preset size threshold;

determining whether the quality is greater than a preset quality threshold;

retaining the target image in response that the quality is greater than or equal to the preset quality threshold;

deleting the target image in response that the size is smaller than the preset size threshold, or in response that the size is greater than or equal to the preset size threshold but the quality is less than the preset quality threshold;

normalizing a size of the retained target images to a preset target size;

training an anti-neural network model according to the training data set;

generating a candidate image through the trained anti-neural network model; and complementing the candidate image through a detail completion network model to obtain a target image according to a comparison image.

2. The image generation method of claim 1, wherein the generating a candidate image through the trained anti-neural network model comprises:

generating a random number using a random algorithm;

generating a plurality of interesting images through the trained anti-neural network model;

obtaining a plurality of hash values by calculating a hash value of each of the plurality of interesting images;

selecting a target hash value equal to the random number from the plurality of hash values; and determining an image corresponding to the target hash value as the candidate image.

3. The image generation method of claim 1, wherein the complementing the candidate image through a detail completion network model to obtain a target image according to a comparison image comprises:

inputting the candidate image and the comparison image into the detail completion network model;

extracting preset features of the comparison image using the detail completion network model; and adding the extracted preset features to the candidate image using the detail completion network model to obtain the target image.

4. The image generation method of claim 1, wherein the training an anti-neural network model according to the training data set comprises:

putting images belonging to a same type of the training data set into a preset anti-neural network, the preset anti-neural network comprises an image generation neural network and an image identification neural network;

ending the training of the anti-neural network, when a quality difference within pairs of images continuously generated by the image generation neural network is less than a preset first threshold and a loss function value of the image identification neural network is less than a preset second threshold.

5. The image generation method of claim 1, wherein the preset anti-neural network is a Progressive Growing of Generative Adversarial Net (PGGAN), and an up-sampling in the PGGAN is changed from a deconvolution to a combination of nearest neighbor search and convolution.

6. A computing device, comprising:

at least one processor; and a storage device storing one or more programs which when executed by the at least one processor, causes the at least one processor to:

acquire a plurality of original images;

process the plurality of original images to obtain a training data set, comprising:

normalize a format of each of the plurality of original images to a Portable Network Graphics (PNG) format;

detect a target object in each of the normalized images and obtain a plurality of target images by segmenting the target object;

obtain an initial size of each of the plurality of target images;

determine whether the initial size is greater than a preset size threshold;

calculate a quality of each of the plurality of target images in response that the initial size is greater than or equal to the preset size threshold;

determine whether the quality is greater than a preset quality threshold;

retain the target image in response that the quality is greater than or equal to the preset quality threshold;

delete the target image in response that the size is smaller than the preset size threshold, or the size is greater than or equal to the preset size threshold but the quality is less than the preset quality threshold;

normalize a size of the retained target images to a preset target size;

train an anti-neural network model according to the training data set;

generate a candidate image through the trained anti-neural network model; and complement the candidate image through a detail completion network model to obtain a target image according to a comparison image.

7. The computing device of claim 6, wherein the at least one processor to generate a candidate image through the trained anti-neural network model comprises:

generate a random number using a random algorithm;

generate a plurality of interesting images through the trained anti-neural network model;

obtain a plurality of hash values by calculating a hash value of each of the plurality of interesting images;

select a target hash value equal to the random number from the plurality of hash values; and determine an image corresponding to the target hash value as the candidate image.

8. The computing device of claim 6, wherein the at least one processor to complement the candidate image through a detail completion network model to obtain a target image according to a comparison image comprises:

input the candidate image and the comparison image into the detail completion network model;

extract preset features of the comparison image using the detail completion network model; and add the extracted preset features to the candidate image using the detail completion network model to obtain the target image.

9. The computing device of claim 6, wherein at least one processor to train an anti-neural network model according to the training data set comprises:

put images belonging to a same type of the training data set into a preset anti-neural network, the preset anti-neural network comprises an image generation neural network and an image identification neural network;

end the training of the anti-neural network, when a quality difference within pairs of images continuously generated by the image generation neural network is less than a preset first threshold and a loss function value of the image identification neural network is less than a preset second threshold.

10. The computing device of claim 6, wherein the preset anti-neural network is a Progressive Growing of Generative Adversarial Net (PGGAN), and an up-sampling in the PGGAN is changed from a deconvolution to a combination of nearest neighbor search and convolution.

11. A non-transitory storage medium having stored thereon instructions that, when executed by a processor of a computing device, causes the computing device to perform an image generation method, the method comprising:

acquiring a plurality of original images;

processing the plurality of original images to obtain a training data set, comprising:

normalizing a format of each of the plurality of original images to a Portable Network Graphics (PNG) format;

detecting a target object in each of the normalized images and obtaining a plurality of target images by segmenting the target object;

obtaining an initial size of each of the plurality of target images;

determining whether the initial size is greater than a preset size threshold;

calculating a quality of each of the plurality of target images in response that the initial size is greater than or equal to the preset size threshold;

determining whether the quality is greater than a preset quality threshold;

retaining the target image in response that the quality is greater than or equal to the preset quality threshold;

deleting the target image in response that the size is smaller than the preset size threshold, or in response that the size is greater than or equal to the preset size threshold but the quality is less than the preset quality threshold;

normalizing a size of the retained target images to a preset target size;

training an anti-neural network model according to the training data set;

generating a candidate image through the trained anti-neural network model; and complementing the candidate image through a detail completion network model to obtain a target image according to a comparison image.

12. The non-transitory storage medium of claim 11, wherein the generating a candidate image through the trained anti-neural network model comprises:

generating a random number using a random algorithm;

generating a plurality of interesting images through the trained anti-neural network model;

obtaining a plurality of hash values by calculating a hash value of each of the plurality of interesting images;

selecting a target hash value equal to the random number from the plurality of hash values; and determining an image corresponding to the target hash value as the candidate image.

13. The non-transitory storage medium of claim 11, wherein the complementing the candidate image through a detail completion network model to obtain a target image according to a comparison image comprises:

inputting the candidate image and the comparison image into the detail completion network model;

extracting preset features of the comparison image using the detail completion network model; and adding the extracted preset features to the candidate image using the detail completion network model to obtain the target image.

14. The non-transitory storage medium of claim 11, wherein the training an anti-neural network model according to the training data set comprises:

putting images belonging to a same type of the training data set into a preset anti-neural network, the preset anti-neural network comprises an image generation neural network and an image identification neural network;

ending the training of the anti-neural network, when a quality difference within pairs of images continuously generated by the image generation neural network is less than a preset first threshold and a loss function value of the image identification neural network is less than a preset second threshold.

* * * * *